Jan. 8, 1929.　　　　　　　　　　　　　　　　　　　　1,697,851
F. M. CASE
OPERATING MECHANISM FOR FISHING REELS
Filed June 26, 1925

Inventor
Francis M. Case
By Brockett, Hyde & Milburn
Attorneys

Patented Jan. 8, 1929.

1,697,851

UNITED STATES PATENT OFFICE.

FRANCIS M. CASE, OF CLEVELAND, OHIO, ASSIGNOR TO THE ENTERPRISE MANUFACTURING COMPANY, OF AKRON, OHIO, A CORPORATION OF OHIO.

OPERATING MECHANISM FOR FISHING REELS.

Original application filed July 26, 1923, Serial No. 653,916. Divided and this application filed June 26, 1925. Serial No. 39,727.

This invention relates to improvements in fishing reels, the present application being a division of my co-pending application for fishing reels, filed July 26, 1923, Serial No. 653,916.

The object of this invention is to provide an improved mounting for the main driving crank and to also provide an improved frictional connecting means in the spool driving mechanism.

Further objects of the invention are in part obvious and in part will appear more in detail hereinafter.

Figure 1:
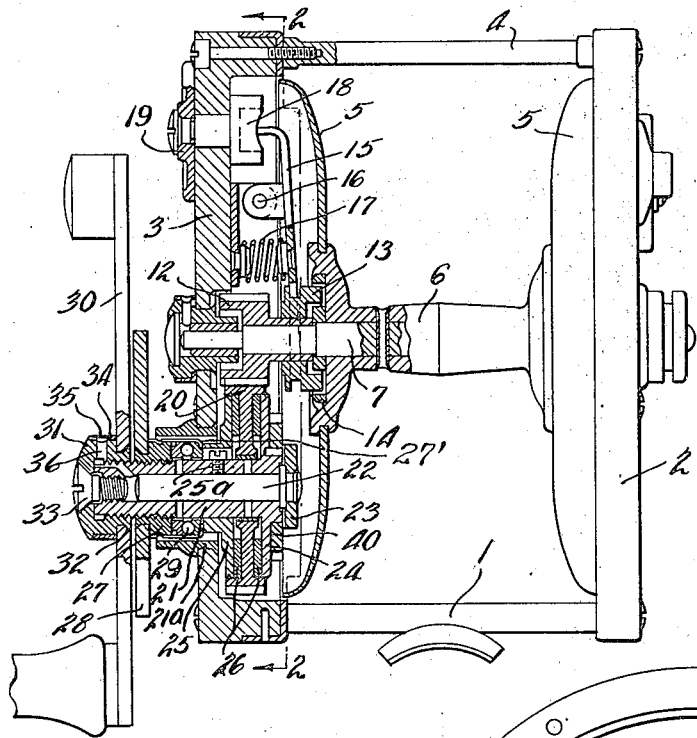
Figure 2:
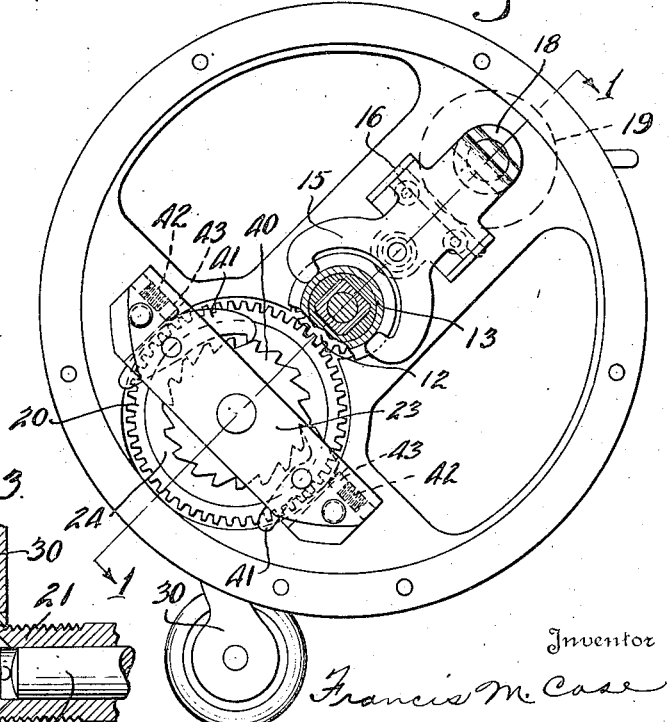
Figure 4:
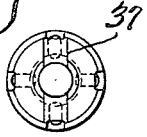
Figures 3, 5:
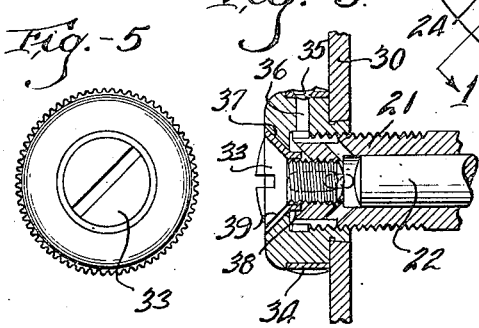

In the drawing, Fig. 1 is a side elevation of a fishing reel embodying the invention, part thereof being broken away and in section; Fig. 2 is a cross sectional view on the line 2—2, Fig. 1; Fig. 3 is a detail view, corresponding to Fig. 1 and illustrating a modification in the crank attaching device; Fig. 4 is an end view, from the left in Fig. 3, of the crank operating sleeve or shaft, other parts being omitted; and Fig. 5 is an end view of the parts from the left in Fig. 3.

The fishing reel shown in the drawing includes the usual frame having a foot plate 1 adapted for attachment to a fishing rod and end caps or heads 2, 3 connected by the usual pillars or posts 4, and in which frame rotates a line receiving spool. Said spool comprises two concave end heads 5 suitably mounted upon the ends of a hub member 6, the latter being sleeved upon and rotatable with the spool shaft or spindle 7 journalled in suitable bearings in the end heads of caps 2, 3.

The spindle 7 is provided at one end with a driving pinion 12, rotatable thereon, and to which is connected a clutch member 13 rotatable with said pinion and slidable longitudinally into engagement with a clutch member 14 fixed on the spool. The clutch is operated by any suitable means, such as the lever 15 pivoted at 16 and normally caused to move the clutch into clutching position by the effect of a compression spring 17. A rotatable cam 18 may, however, be actuated by rotating an operating button 19 to disengage the clutch and secure free spool effects.

The driving pinion 12 is driven by a gear 20 adapted to be frictionally driven as will appear by rotation of a sleeve-like shaft 21 journalled upon a post or stud 22 carried by a bridge 23 fixed to the frame end head. Said sleeve at one end has a flange or disk 24 lying on one side of gear 20 and opposed to a longitudinally adjustable disk 25 lying on the other side of said gear and driven by a pin 25ᵃ. Friction washers or disks 26 are interposed between the gear 20 and the two disks 24, 25. The frictional pressure upon the gear 20 may be varied by longitudinally adjusting member 25 toward or from its companion member 24. This effect is secured by rotation of a nut 27 having an operating member 28 permanently secured thereto and adapted through a ball bearing device 29 to exert more or less pressure on the hub of member 25. The nut 27 has suitably secured thereto a sleeve member 27' which surrounds the ball bearing device 29. The outer end of said sleeve member is bent inwardly over the end of said ball bearing device so as to secure said device to the nut and thereby enable them to be handled as a unit.

The sleeve shaft 21 extends through the hollow boss 21ᵃ and is rotatable by the usual driving crank 30, which in this case is permanently attached to a nut 31, such as by beading over the metal of said nut as at 32. Said nut is screwed upon the end of the sleeve 21 and is secured in place by a screw 33. The driving strain of the crank is therefore, transmitted directly to the end of shaft 21 instead of to a washer or shoulder thereon as is usually the case.

The parts may be lubricated by rotating a ring 34 surrounding nut 31 to bring its opening 35 into registration with the nut channel 36 leading to the end of the post 22 so that lubricant will flow to the bearing surfaces, as will appear in Fig. 1.

If desired, the arrangement shown in Figs. 3, 4 and 5 may be employed. In this case, the end of the sleeve 21 is slotted diametrically, as at 37, to receive tongues 38 on the small end of a conical washer 39, so that when the clamping screw 33 is screwed up, there is no tendency to rotate the nut 31.

Keyed to the sleeve 21 at its inner end and neighboring the disk 24 is a ratchet 40 cooperating with one or more pivoted pawls 41, two being shown, each pawl being subject to the pressure of a spring 42 on a button 43, the pawls being carried by the bridge 23 before referred to.

Assuming the clutch 13, 14 to be in clutching position rotation of the crank 30 in the winding direction frictionally drives the spool to wind in the line with a force dependent upon the amount of friction in the friction drive to gear 20, with a slip in said friction drive when the pull on the line exceeds the frictional resistance. When the crank is released, however, it will not rotate in the unwinding direction but is automatically held from such rotation by the pawls 41. Therefore, a fish attempting to run out with the line is automatically subjected to the frictional effect of the drive to gear 20 without special attention on the part of the operator. Also when the hook is snagged, the line will not be broken by excessive winding pull.

What I claim is:

1. A fishing reel, comprising a frame, a rotatable spool, driving mechanism for said spool including a shaft having an operating crank, a gear rotated by said shaft, a friction connection between said shaft and gear, and means for adjusting said friction connection, comprising a manually operable device carrying an anti-friction bearing, said device and bearing being permanently connected and adapted to be handled as a unit.

2. In a fishing reel, a frame, a spool therein, driving mechanism for said spool including a shaft and a friction drive connection between said shaft and spool, the outer end of the shaft being threaded, a cap nut threaded on the outer end of the shaft and provided with an operating crank secured thereto, a locking screw for securing said cap nut to the outer end of the shaft, and an adjusting member for the friction drive connection adjustable on the threads of said shaft inwardly of said cap nut.

3. A fishing reel, comprising a frame, a rotatable spool, driving mechanism for the spool including a shaft, an operating crank on the shaft, a spool driving gear on the shaft, a friction drive connection between the gear and the shaft, and means for adjusting the friction drive, comprising a nut on the shaft, a bearing between the nut and the friction drive connection including two races and rolling elements between the races, and means for preventing the separation of the races when the driving mechanism is disassembled.

In testimony whereof I hereby affix my signature.

FRANCIS M. CASE.